Patented Oct. 12, 1926.

1,602,802

UNITED STATES PATENT OFFICE.

WALTER WALLACE, OF LA SALLE, NEW YORK, ASSIGNOR TO OLDBURY ELECTRO-CHEMICAL COMPANY, OF NIAGARA FALLS, NEW YORK, A CORPORATION OF NEW YORK.

MANUFACTURE OF OXALATES AND OXALIC ACID.

No Drawing. Application filed March 23, 1920, Serial No. 368,121. Renewed October 4, 1923.

This invention relates to improvements in the manufacture of oxalates and oxalic acid, and has for its object to simplify the process for the synthetic production of oxalates and oxalic acid employed commercially, in order to economize labor, fuel, and plant repairs, and also to obtain better yields.

The present practice is to absorb carbon monoxid in an alkali or alkaline solution under heat and pressure, as sodium hydroxid, to form sodium formate, or sodium formate solution, which is then evaporated, then heated to form sodium oxalate with evolution of hydrogen, then treated with calcium hydroxid and water to precipitate calcium oxalate, with regeneration of sodium hydroxid in solution, and the separated calcium oxalate treated with sulphuric acid to form oxalic acid, the regenerated sodium hydroxid being used over again.

According to this invention, sodium oxalate and an equivalent amount of calcium hydroxid, mixed with water, is treated with carbon monoxid, preferably under pressure and above 100° C., resulting in a precipitate of calcium oxalate and a solution of sodium formate according to the reaction

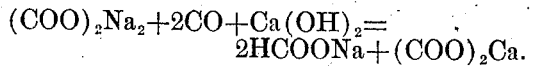

$(COO)_2Na_2 + 2CO + Ca(OH)_2 = 2HCOONa + (COO)_2Ca$.

The calcium oxalate is then separated and, if desired, treated to produce oxalic acid, as with sulphuric acid, and the sodium formate solution evaporated and heated to form additional sodium oxalate. This is then used to produce more sodium formate and calcium oxalate.

In heating sodium formate to produce sodium oxalate, sodium carbonate is more or less produced according to the conditions. It is desirable to remove this, either as an impurity in sodium oxalate or to save loss of calcium hydroxid in making calcium oxalate by the known process wherein sodium oxalate is treated with calcium hydroxid and water to produce calcium oxalate which is then treated by well known methods with sulphuric acid to produce oxalic acid, the sodium hydroxid produced being used over again in absorbing carbon monoxid to produce sodium formate. Removal of carbonate is accomplished by any suitable means, as for instance by stirring 90 parts of sodium oxalate and 10 parts of sodium carbonate in 40 parts of water at 24° C., the entire amount of sodium carbonate dissolves and only .17 part of sodium oxalate. The latter can then be filtered out and washed. Excess water can be used over and over until saturated, at which time at 24° C. it will carry 265 g. of sodium carbonate and 3 g. of sodium oxalate to 1000 g. of water. By removing sodium carbonate from sodium oxalate, prior to treating the latter with calcium hydroxid and water to form calcium oxalate and sodium hydroxid, or with calcium hydroxid and water and carbon monoxid as stated above, to form calcium oxalate and sodium formate, calcium oxalat; free from calcium carbonate is formed, and in decomposing this with sulphuric acid to form oxalic acid there is a saving of sulphuric acid equivalent to the sodium carbonate removed.

If desired the sodium carbonate solution with an equivalent amount of calcium hydroxid may be treated with carbon monoxid under heat and pressure, as above described in the case of sodium oxalate, to form sodium formate solution and precipitated calcium carbonate, the calcium carbonate being removed from the process, and the sodium formate solution evaporated and converted to additional sodium oxalate as above described.

In order to save heat, and obtain a higher yield of oxalate from formate, the formate is preferably melted in one vessel, and introduced molten into the heated reaction vessel to produce oxalate. I preferably melt the formate in one vessel, the melting point being about 251° C., then introduce it at say 270° C., which is below the lowest point of decomposition, into the reaction vessel, so as to confine the decomposition to the latter, which is preheated to as high as 440° C. The conversion is complete in about five minutes, owing to the rapid release of exothermic heat throughout the mass and approximately over 90% of the formate is converted into oxalate. Agents for increasing the yield will, if used, be added to the melted formate.

As an example, 94 kg. of calcium hydroxid and 170 kg. of sodium oxalate are dissolved or mixed in 1000 l. of water, and agitated in a closed vessel at about 130° C. and 65 pounds per square inch pressure with carbon monoxid, or gases containing carbon monoxid not otherwise determental to the reaction. The solids do not completely dissolve but form a sludge from which the gases separate slowly. Fresh gas is admitted and residual gas removed, either continuously or intermittently, as desired. When no more gas is absorbed, a solution of approximately 173 kg. of sodium formate in 1000 l. of water is left, and approximately 163 kg. of solid suspended calcium oxalate. The latter can be easily separated, and the former evaporated, and heated, in the ordinary manner, or after melting as before stated.

These conditions can be varied without departure from the invention. For complete conversion, the sodium oxalate and calcium hydroxid should be in equivalent proportions, but if not, the excess constituent remains unchanged. The reaction proceeds appreciably at 100° C., but is expedited at higher temperature, and by employing the gas under pressure. The actual pressure and temperature will in practice be such as to permit reasonable economy of costs of apparatus and operation. The water should be sufficient to hold the sodium formate in solution and the calcium oxalate in suspension at such concentrations as to give the sludge a sufficient thinness to permit proper agitation with the gas.

By this invention, a cyclic process is provided wherein there is no loss of formate forming metal, as sodium, in the examples here given.

Where specific materials are mentioned in the specifications and claims it is understood that substitutes or equivalent materials, with suitable changes in proportions and working conditions, can be used without departure from the invention, as may also gases not absorbed by alkalis, or by solutions of alkaline bases, but containing carbon monoxid, or not otherwise detrimental to the reactions desired.

I do not specifically claim herein the novel process of introducing molten formate, as the same is described and claimed in Patent 1,506,872, granted September 2, 1924.

What is claimed is:—

1. The treatment of a mixture of water and substantially equivalent quantities of calcium hydroxid and sodium oxalate at 130° C. and 65 pounds pressure, with carbon monoxid until absorption ceases.

2. The process which consists in forming a sludge of approximately 1000 parts of water, 94 parts of calcium hydroxid and 170 parts of sodium oxalate, and treating same with carbon monoxid under heat and pressure.

Signed at Niagara Falls in the county of Niagara and State of New York this 15th day of March A. D. 1920.

WALTER WALLACE.